(12) United States Patent
Miller et al.

(10) Patent No.: US 6,497,490 B1
(45) Date of Patent: *Dec. 24, 2002

(54) LASER BEAM ATTENUATOR AND METHOD OF ATTENUATING A LASER BEAM

(75) Inventors: Gregory D. Miller, Foster City, CA (US); Ying-Moh Liu, Saratoga, CA (US)

(73) Assignees: Silicon Light Machines, Sunnyvale, CA (US); Nutech Optical Systems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/461,503

(22) Filed: Dec. 14, 1999

(51) Int. Cl.⁷ .......................... G02B 5/04; G02B 27/00; G02B 27/10
(52) U.S. Cl. ................. 359/614; 359/618; 359/638; 359/640; 359/834; 359/837
(58) Field of Search ................ 359/614, 629, 359/633, 634, 638, 639, 640, 833, 834, 837, 888, 900, 618

(56) References Cited

U.S. PATENT DOCUMENTS

| | | | |
|---|---|---|---|
| 3,443,871 A | * | 5/1969 | Chitayat |
| 3,792,916 A | * | 2/1974 | Sarna |
| 4,707,064 A | * | 11/1987 | Dobrowolski et al. |
| 4,711,526 A | * | 12/1987 | Hennings et al. |
| 4,824,200 A | * | 4/1989 | Isono et al. |
| 5,311,360 A | | 5/1994 | Bloom et al. ............... 359/572 |
| 5,808,797 A | | 9/1998 | Bloom et al. ............... 359/572 |
| 5,841,579 A | | 11/1998 | Bloom et al. ............... 359/572 |
| 5,920,411 A | * | 7/1999 | Duck et al. |
| 6,075,632 A | * | 6/2000 | Braun |
| 6,169,624 B1 | | 1/2001 | Godil et al. ................. 359/237 |

OTHER PUBLICATIONS

Hecht, *Optics*, 2nd ed., 1987, pp. 163–169.
"Deep Sky Black," Equinox Interscience, www.eisci.com/deepsky;html, 1997.
"Absorptive Neutral Density Filters," Newport corp., Irvine, CA, www.newport.com, May 7, 1999.
"High Energy Variable Attenuators," Newport Corp., Irvine, CA, www,newport.com, May 7, 1999.
"Neutral–Density Filters," New Focus, Inc., Santa Clara, CA, www.newfocus.com, May 7, 1999.
Apte et al., "Deformable Grating Light Valves for High Resolution Displays," Solid State Actuator Workshop, Hilton Head, South Carolina, Jun. 13–16, 1994; pp. 1–6.
Sene et al., "Polysilicon micromechanical gratings for optical modulation," Sensors and Actuators, vol. A57, pp. 145–151, 1996.
Amm et al., "*Invited Paper:* Grating Light Valve™ Technology: Update and Novel Applications," SID Digest, vol. 29, 1998; pp. 29–32.

* cited by examiner

*Primary Examiner*—Ricky D. Shafer
(74) *Attorney, Agent, or Firm*—Haverstock & Owens LLP

(57) ABSTRACT

A laser beam attenuator and a method of attenuating a laser beam are disclosed. The laser beam attenuator includes first and second prisms, a beam dump, and a light absorbing body. An input laser beam partially refracts and partially reflects at a first surface of the first prism to form first refracted and reflected laser beams. The first reflected laser beam partially refracts and partially reflects at a second surface of the second prism to form second refracted and reflected laser beams. The beam dump and the light absorbing body absorb the first and second refracted laser beams. Thus, the second reflected laser beam forms an attenuated laser beam.

13 Claims, 4 Drawing Sheets

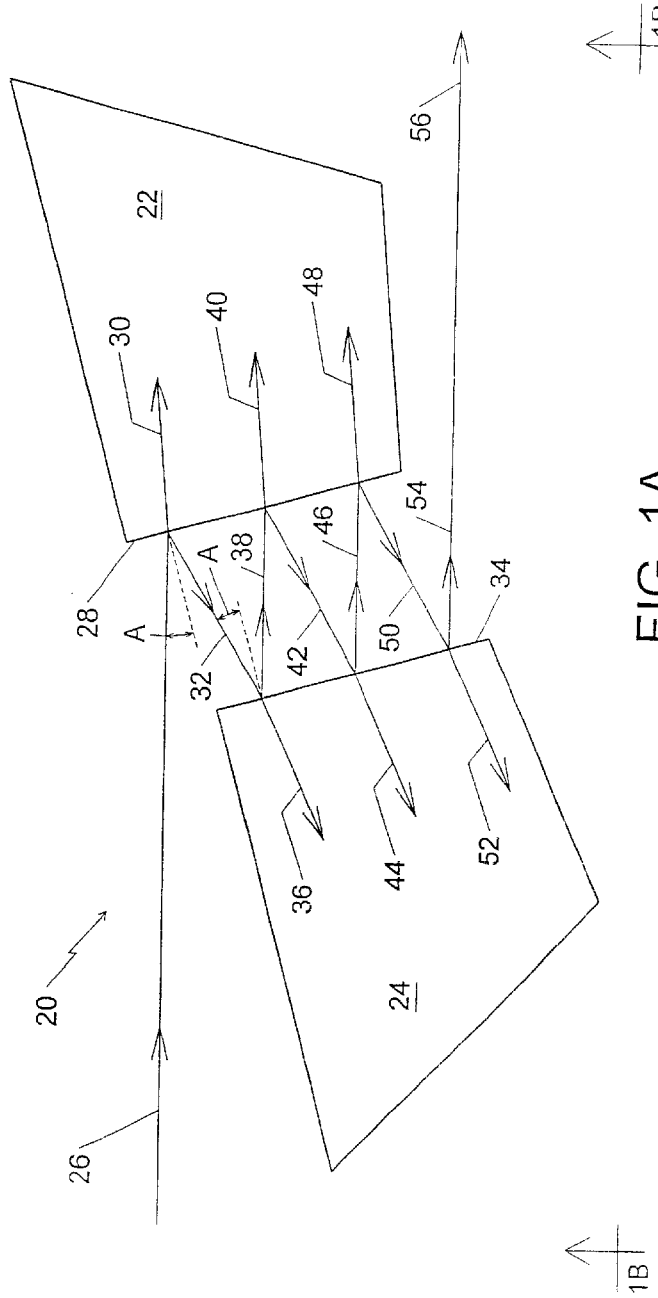
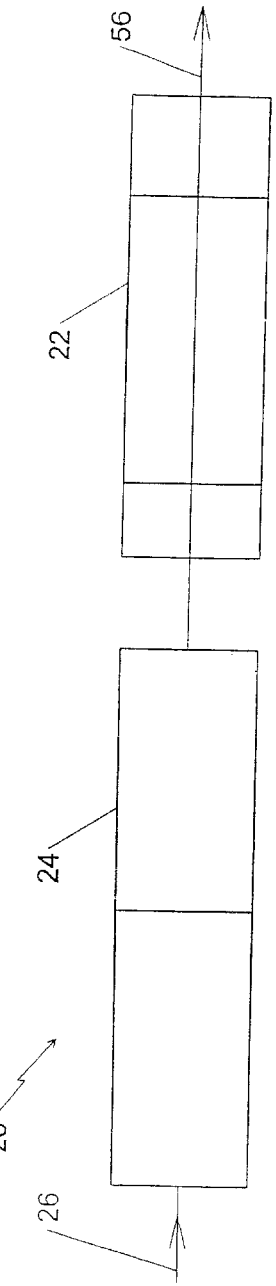
FIG. 1A
FIG. 1B

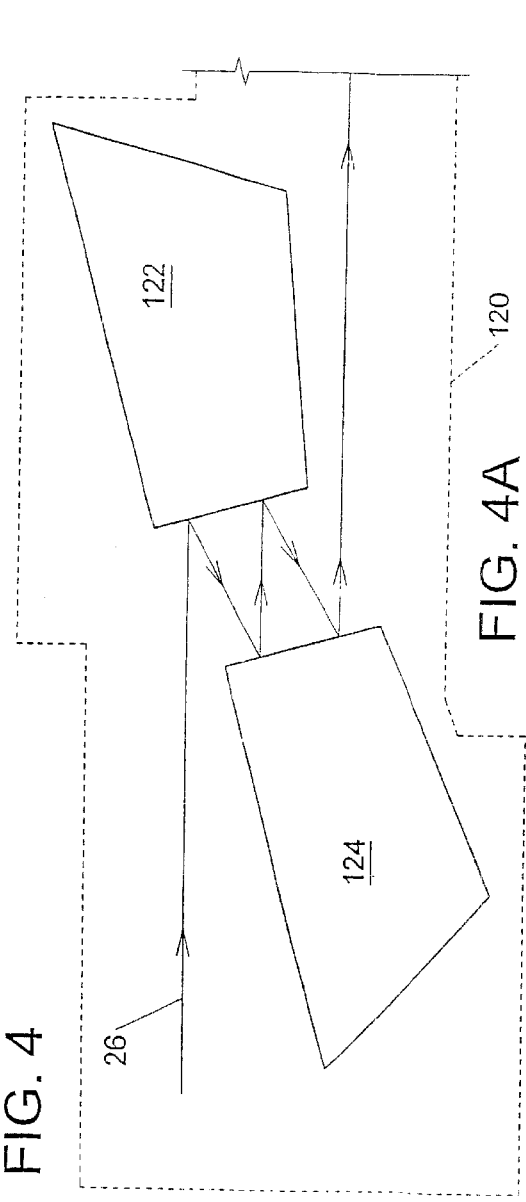
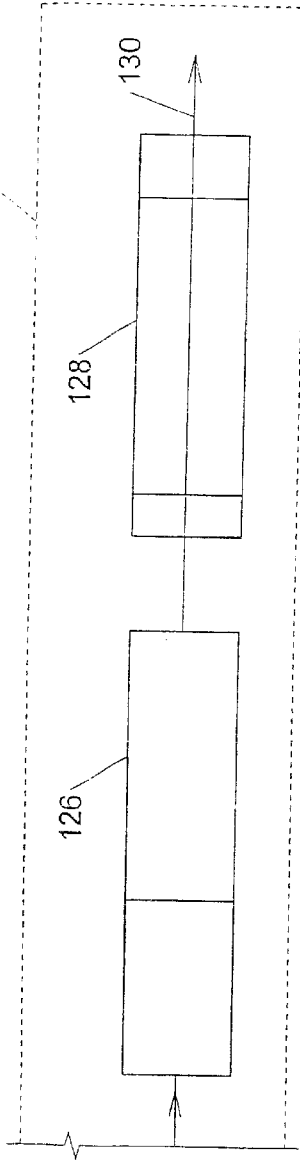

LASER BEAM ATTENUATOR AND METHOD OF ATTENUATING A LASER BEAM

FIELD OF THE INVENTION

The present invention relates to the field of lasers. More particularly, the present invention relates to the field of attenuating laser beams.

BACKGROUND OF THE INVENTION

There are a variety of reasons for characterizing a laser. One means for characterizing a laser beam is to use CCD's (Charge Coupled Devices). Many laser beams of interest are too powerful for direct observation by the CCD's. A laser beam attenuator reduces the power of such laser beams so that the beams can be characterized by the CCD's. Laser beam attenuators of the prior art include absorptive and reflective neutral density filters, multilayered dielectric filters, high energy variable attenuators, diffractive beam splitters, and polarizing variable attenuators.

The absorptive neutral density filters include an optically absorptive material which is formed within an optically transparent material. The optically absorptive material absorbs part of the incident laser beam so that a transmitted laser beam is attenuated. Due to the absorptive nature of the absorptive neutral density filters, absorptive neutral density filters are capable of attenuating low power laser beams only. Also, absorptive neutral density filters induce wavefront distortion and polarization effects.

The reflective neutral density filters include a metallized partial reflector on an optical substrate. The laser beam is incident upon the metallized partial reflector, which partially reflects and partially transmits the remaining portion of the laser beam. The partially transmitted laser beam forms the attenuated laser beam. Though reflective neutral density filters, they also induce the wavefront distortion and polarization effects. The reflective neutral density filters attenuate higher power laser beams than the absorptive neutral density filters but are not feasible for attenuating high power laser beams having high power densities.

The multilayered dielectric filters include alternating layers of a high index of refraction material and a low index of refraction material. These alternating layers are deposited on an optical substrate. The multilayered dielectric filters reflect part of the laser beam and transmit the remaining part of the laser beam. The transmitted laser beam forms the attenuated laser beam. Some multilayered dielectric filters are highly wavelength dependent. So such filters must be used with specific wavelength laser beams. Also, the multilayered dielectric filters induce the wavefront distortion. Further, the multilayered dielectric filters are expensive, lack precision, and are not feasible for attenuating high power laser beams having high power densities.

The polarizing variable attenuators include first and second polarizers. The first polarization angle of the first polarizer is at an angle of less than 90° to the second polarization angle of the second polarizer. The laser beam is attenuated by absorption in the first and second polarizers. By allowing the first polarization angle to be varied with respect to the second polarizer, the polarizing variable attenuators are made variable. Due to the absorptive nature of the polarizer pairs, the polarizer pairs are limited to attenuating low power laser beams. Further, the polarizing variable attenuators are highly polarization dependent.

The high energy variable attenuators include first and second sets of parallel optical plates. The parallel optical plates attenuate the laser beam by Fresnel reflections from each successive optical plate. Thus, the transmitted laser beam forms the attenuated laser beam. By varying an incidence angle, the high energy variable attenuators are made variable. The second set of parallel plates is oriented such that a beam deviation introduced by the first set of parallel plates is cancelled by the second set of parallel plates. The high energy variable attenuators are highly polarization dependent. The high energy variable attenuators are typically limited to an attenuation of about 40 dB. Also, the high energy variable attenuators induce the wavefront distortion since some reflected light recombines with the transmitted laser beam due to additional reflections.

What is needed is a laser beam attenuator having low wavefront distortion, good power handling, a large fixed attenuation value, a low polarization effect, and low wavelength dependence.

SUMMARY OF THE INVENTION

The present invention is a laser beam attenuator and a method of attenuating a laser beam. The laser beam attenuator includes first and second prisms, a beam dump, and a light absorbing body. An input laser beam partially refracts and partially reflects at a first surface of the first prism to form first refracted and reflected laser beams. The first reflected laser beam partially refracts and partially reflects at a second surface of the second prism to form second refracted and reflected laser beams. The beam dump and the light absorbing body absorb the first and second refracted laser beams. Thus, the second reflected laser beam forms an attenuated laser beam. An alternative laser beam attenuator uses the first prism. In the alternative laser beam attenuator, the first reflected laser beam forms an alternative attenuated laser beam.

BRIEF DESCRIPTION OF THE DRAWINGS

FIG. 1A illustrates a plan view of an optical arrangement of the present invention.

FIG. 1B illustrates an elevation view of the optical arrangement of the present invention.

FIGS. 4, 4A, and 4B illustrate an alternative embodiment of a laser beam attenuator of the present invention.

DETAILED DESCRIPTION OF THE PREFERRED EMBODIMENT

Figure 2:
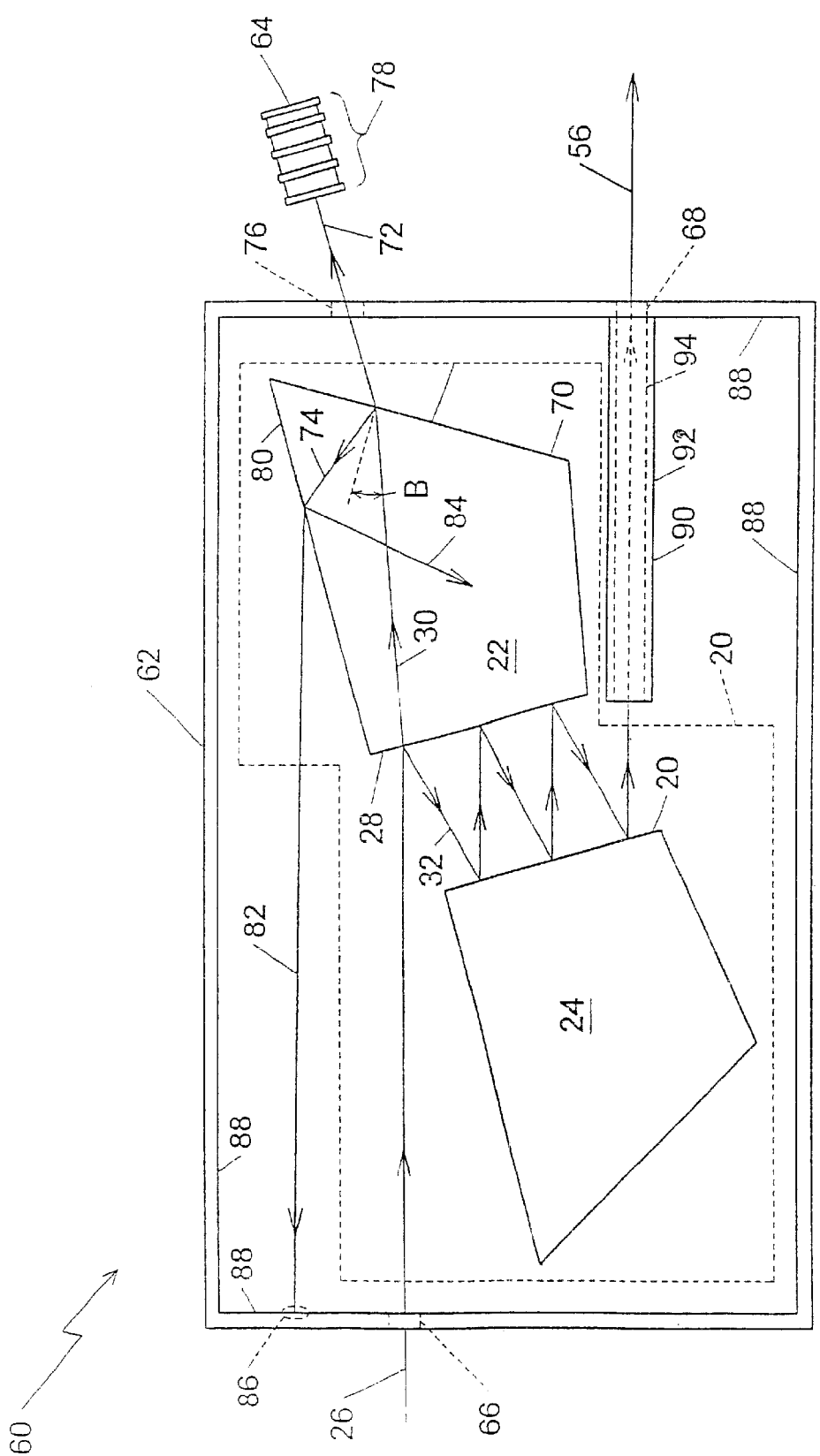
FIG. 2 illustrates the preferred laser beam attenuator of the present invention.

A plan view of an optical arrangement of the present invention is illustrated in FIG. 1A. The optical arrangement 20 includes a first prism 22 and a second prism 24. An elevation view of the optical arrangement 20 is illustrated in FIG. 1B. An input laser beam 26 is incident upon a first surface 28 of the first prism 22 with a first incidence angle A. The input laser beam 26 partially refracts through the first surface 28 to form a first refracted laser beam 30. The input laser beam 26 partially reflects from the first surface to form a first reflected laser beam 32.

For an exemplary first incidence angle A of 10° and an exemplary index of refraction for the first prism 22 of 1.5, a perpendicular reflection coefficient is 0.2041 and a parallel reflection coefficient is 0.1959. The perpendicular and parallel reflection coefficients are in relation to a plane of incidence, which is defined by the input laser beam 26 and the first reflected laser beam 32. The perpendicular and parallel reflection coefficients correspond to perpendicular and parallel polarizations, respectively. Squaring the perpendicular and parallel reflection coefficients gives perpendicular and parallel reflectances, which are intensity factors for the first reflected laser beam 32 relative to the input laser beam 26. The perpendicular reflectance is 0.0417. The parallel reflectance is 0.0384. An average reflectance is 0.0400 or 4%; the reflected beam 32 is 4% as intense as the input beam 26. Thus, reflecting the incident laser beam 26 from the first surface 28 attenuates the incident laser beam 26 by 96%. For some applications, a 96% attenuated laser beam is sufficiently attenuated.

The second prism 24 further attenuates the input laser beam 26. The first reflected laser beam 32 is incident upon a second surface 34 of the second prism 24 with the first incidence angle A. The second prism 24 partially refracts the first reflected laser beam 32 through the second surface 34. The second prism 24 partially reflects the first reflected laser beam 32 from the second surface 34. Thus, second refracted and reflected laser beams, 36 and 38, are formed, respectively. For the exemplary first incidence angle A of 10° and the exemplary index of refraction of 1.5, the second reflected laser beam 38 has a 0.0016% intensity relative to the input laser beam 26.

The first and second prisms 22 and 24 further attenuate the input laser beam 26. The first prism 22 partially refracts the second reflected laser beam 38 through the first surface 28. The first prism 24 partially reflects the second reflected laser beam 38 from the first surface 28. Thus, third refracted and reflected laser beams, 40 and 42, are formed, respectively. The second prism 24 partially refracts the third reflected laser beam 42 through the second surface 34. The second prism 24 partially reflects the third reflected laser beam 42 from the second surface 34. Thus, fourth refracted and reflected laser beams, 44 and 46, are formed, respectively. For the exemplary first incidence angle A of 10° and the exemplary index of refraction of 1.5, the fourth reflected laser beam 46 has a −55.9 dB intensity relative to the input laser beam 26.

The first and second prisms 22 and 24 illustrated in FIG. 1 are configured to additionally attenuate the input laser beam 26. The first prism 22 partially refracts and partially reflects the fourth reflected laser beam 46 to form fifth refracted and reflected laser beams, 48 and 50. The second prism 24 partially refracts and partially reflects the fifth reflected laser beam 50 to form sixth refracted and reflected laser beams, 52 and 54. The sixth reflected laser beam 54 forms a preferred attenuated laser beam 56. For the exemplary first incidence angle A of 10° and the exemplary index of refraction of 1.5, the preferred attenuated laser beam 56 has a −83.87 dB intensity relative to the input laser beam 26. If the input laser beam 26 has the perpendicular polarization, the preferred attenuated laser beam 56 will have a −82.82 dB intensity relative to the input laser beam 26. If the input laser beam 26 has the parallel polarization, the preferred attenuated laser beam 56 will have a −84.96 dB intensity relative to the input laser beam. Thus, for the exemplary first incidence angle A of 10° and the exemplary index of refraction of 1.5, a maximum polarization effect is 2.14 dB, which is relatively minor compared to an average attenuation of 83.87 dB. It will be readily apparent to one of ordinary skill in the art that reducing the first incidence angle A will reduce the maximum polarization effect.

For an exemplary range of first incidence angles A of between 5 and 15°, the preferred attenuated laser beam 56 has an intensity relative to the input laser beam 26 of −83.88 and −83.82 dB. Thus, the average attenuation is insensitive to minor changes in the first incidence angle A.

As will be apparent to one of ordinary skill in the art, the relative amount of attenuation can be incrementally selected according to the length of the sides 28 and 34 of the prisms 22 and 24, respectively. It will be readily apparent to one of ordinary skill in the art that the first, second, third, fourth, or fifth reflected laser beam, 32, 38, 42, 46, or 50, could be used as a first alternative attenuated laser beam with less attenuation than the preferred attenuated laser beam 56. It will also be readily apparent to one of ordinary skill in the art that additional partial reflections from the first prism 22 or the first and second prisms, 22 and 24, will form a second alternative attenuated laser beam with more attenuation than the preferred attenuated laser beam. Further, it will be readily apparent to one of ordinary skill in the art that an amount of attenuation can be adjusted by changing the index of refraction for the first or second prisms, 22 or 24.

The first and second prisms, 22 and 24, are configured such that the first, second, third, fourth, fifth, and sixth refracted laser beams, 30, 36, 40, 44, 48, and 52, exit the first and second prisms, 22 and 24, without interfering with the preferred attenuated laser beam 56. Thus, the first and second prisms, 22 and 24, are configured to eliminate co-parallel stray light from interfering with the preferred attenuated laser beam 56. Preferably, the first and second prisms, 22 and 24, are fabricated from an optical material having a low optical absorption coefficient and a low thermo-optic coefficient. A light absorbing body (not shown in FIGS. 1A or 1B) and a beam dump (not shown in FIGS. 1A or 1B) are configured to absorb the first, second, third, fourth, fifth, and sixth refracted laser beams, 30, 36, 40, 44, 48, and 52, upon exiting from the first and second prisms, 22 and 24.

The preferred laser beam attenuator of the present invention is illustrated in FIG. 2. The preferred laser beam attenuator 60 includes the optical arrangement 20, the light absorbing body 62, and the beam dump 64. The input laser beam 26 enters the preferred laser beam attenuator 60 through an input port 66 of the light absorbing body 62. The preferred attenuated laser beam 56 exits the preferred laser beam attenuator 60 through a first exit port 68 of the light absorbing body 62. The input port 66 and the first exit port 68 form input and output apertures, respectively, for the preferred laser beam attenuator 60. The input laser beam 26 partially refracts through the first surface 28 and partially reflects from the first surface 28 to form the first refracted laser beam 30 and the first reflected laser beam 32 as described above relative to FIG. 1.

The first refracted laser beam 30 is incident upon a third surface 70 of the first prism 22 with a second incidence angle B. The first refracted laser beam 30 partially refracts through the third surface 70 and partially reflects from the third surface 70 to form a seventh refracted laser beam 72 and a seventh reflected laser beam 74. The seventh refracted laser beam 72 exits the light absorbing body 62 through a second exit port 76. The seventh refracted laser beam 72 is absorbed by the beam dump 64. The beam dump 64 includes an internal cavity (not shown) and an entrance port (not shown). The internal cavity has a light absorbing surface, which absorbs the seventh refracted laser beam 72. The beam dump 64 preferably includes an external surface 78 that is designed to aid in convecting heat away from the beam dump 64. The beam dump serves two functions in that it reduces stray light and it dissipates heat away from other components of the laser beam attenuator 60.

For the exemplary first incidence angle A of 10°, the exemplary index of refraction of 1.5, and an exemplary second incidence angle B of 23.35°, an intensity of the seventh refracted laser beam 74 is 0.918 of the input laser beam 26. Thus, for this configuration, the beam dump dissipates approximately 91.8% of an input power for the input laser beam 26.

The seventh reflected laser beam 74 is incident upon a fourth surface 80 of the first prism 22. The seventh reflected laser beam 74 partially refracts through the fourth surface 80 and partially reflects from the fourth surface 80 to form eighth refracted and reflected laser beams, 82 and 84, respectively. The eighth refracted laser beam 82 is absorbed by the light absorbing body 62 about an incident region 86. The light absorbing body 62 includes an interior light absorbing surface 88. The light absorbing surface 88 preferably has a high optical absorption coefficient. The light absorbing surface 88 preferably has a low scattering coefficient. A particularly preferred light absorbing surface 88 is an anodized surface known as Deep Sky Black, which is a trademark of Equinox Interscience, Inc.

The light absorbing body 62 preferably includes an output tube 90, which ensures that stray light does not interfere with the preferred attenuated laser beam 56. Outer and inner surfaces, 92 and 94, respectively, of the output tube 90 preferably have the high optical absorption coefficient. More preferably, the outer and inner surfaces, 92 and 94, are the anodized surface known as Deep Sky Black. The light absorbing body preferably includes top and bottom plates (not shown), which include the light absorbing surface 88. A first alternative laser beam attenuator (not shown) includes a second light absorbing body surrounding the beam dump 64 and configured to absorb stray light exiting the second exit port 76.

Figure 3A:
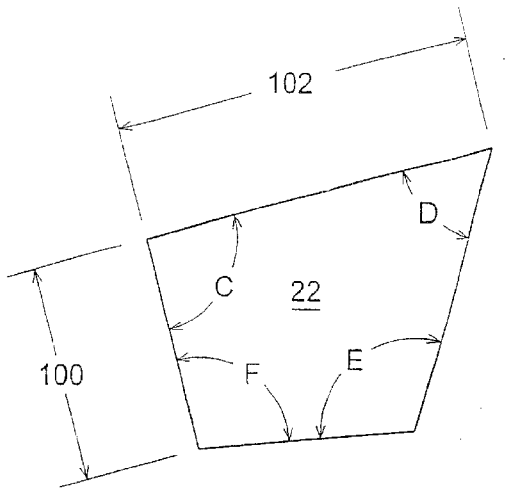
FIGS. 3A, 3B, and 3C illustrate a prism of the present invention.

The first and second prisms, 22 and 24, of the preferred laser beam attenuator 60 are preferably of similar dimensions in order to reduce costs. The second prism 24 is oriented such that a top surface of the second prism is equivalent to a bottom surface of the first prism 22. The first prism 22 is illustrated in FIG. 3A. Preferably, the first prism 22 has first, second, third, and fourth prism angles, C, D, E, and F, respectively, and first and second lengths, 100 and 102, respectively.

Figure 3B:
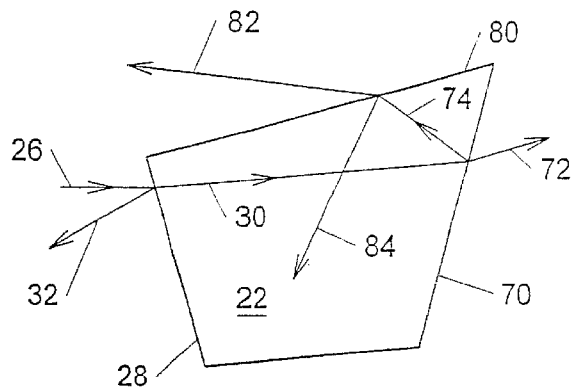

The first prism 22 and the input laser beam 26 are illustrated in FIG. 3B. The input laser beam 26 partially refracts and partially reflects at the first surface 28 to form the first refracted and reflected laser beams, 30 and 32. The first refracted laser beam 30 partially refracts and partially reflects at the third surface 70 to form the seventh refracted and reflected laser beams, 72 and 74. The seventh reflected laser beam 74 partially refracts and partially reflects at the fourth surface 80 to form the eighth refracted and reflected laser beams, 82 and 84. The eighth refracted laser beam 82 is absorbed by the light absorbing body 62 of FIG. 2.

Figure 3C:
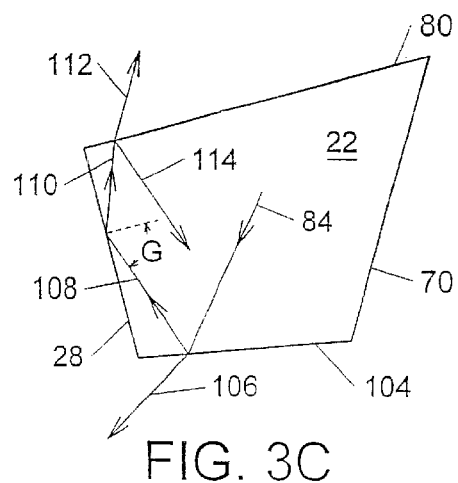

The first prism 22 and the eighth reflected laser beam 84 are illustrated in FIG. 3C. The eighth reflected laser beam 84 partially refracts and partially reflects at a fifth surface 104 to form ninth refracted and reflected laser beams, 106 and 108, respectively. The ninth reflected laser beam 108 totally reflects from the first surface 28 to form a tenth reflected laser beam 110 since a third incidence angle G is greater than a critical angle. For the exemplary index of refraction of 1.5, the critical angle is 41.8°.

The tenth reflected laser beam 110 partially refracts and partially reflects at the fourth surface 80 to form a tenth refracted laser beam 112 and an eleventh reflected laser beam 114. The ninth and tenth refracted laser beams, 108 and 112, are absorbed by the light absorbing body 62 of FIG. 2. The eleventh reflected laser beam 114 will similarly refract out of the first prism 22 through additional partial refractions and partial reflections. Upon the eleventh reflected laser beam 114 refracting out of the first prism 22, the eleventh reflected laser beam 114 will be predominantly absorbed by the light absorbing body 62 of FIG. 2.

The first and second prisms, 22 and 24, are preferably fabricated separately. Alternatively, the first and second prisms are fabricated from an integral block of the optical material such that the first and second prisms, 22 and 24, are structurally connected.

A second alternative laser beam attenuator does not use the beam dump 64 of FIG. 2. The second alternative laser beam attenuator does not include the second exit port 76. In the second alternative laser beam attenuator, the seventh refracted laser beam 72 is absorbed by the light absorbing body 62.

A third alternative laser beam attenuator is illustrated in FIGS. 4, 4A, and 4B. The third alternative laser beam attenuator 120 includes third, fourth, fifth, and sixth prisms, 122, 124, 126, and 128, and a third light absorbing body (not shown). The third and fourth prisms, 122 and 124, attenuate the input laser beam 26 by four pairs partial refractions and reflections. The fifth and sixth prisms, 126 and 128, further attenuate the input laser beam 26 by an additional four pairs of partial refractions and partial reflections to form a third alternative attenuated laser beam 130. The fifth and sixth prisms, 126 and 128, are oriented such that their plane of incidence is orthogonal to that of the third and fourth prisms, 122 and 124. Thus, a minor polarization effect introduced by the third and fourth prisms, 122 and 124, is canceled by the fifth and sixth prisms, 126 and 128. An input polarization state of the input laser beam 26 is approximately equal to an output polarization state of the third alternative attenuated laser beam 130.

A fourth alternative laser beam attenuator includes forced cooling in order to cool the beam dump 64, the light absorbing body 62, or the first and second prisms, 22 and 24.

A prototype laser beam attenuator similar to that shown in FIG. 2 was fabricated and tested. Specific parameters of the prototype laser beam attenuator included the first incidence angle A of 15°, BK-7 optical glass for the optical material for the first and second prisms, 22 and 24, a separation distance between the first and second prisms of 0.593 in., and first and second prism dimensions as listed in Table 1.

TABLE 1

| First prism angle C | 90° |
| Second prism angle D | 60° |
| Third prism angle E | 110° |
| Fourth prism angle F | 100° |
| First length 100 | 0.917 in. |
| Second length 102 | 1.528 in. |

The prototype laser beam attenuator was tested using a 532 nm laser. The BK-7 optical glass has a 532 nm index of refraction of 1.519, which leads to a theoretical attenuation for the preferred attenuated laser beam 56 of 82.3 dB. Test data indicated an attenuation of approximately 83 dB and a wavefront distortion of less than 0.05λ.

It will be readily apparent to one skilled in the art that other various modifications may be made to the preferred embodiment without departing from the spirit and scope of the invention as defined by the appended claims.

What is claimed is:

1. A laser beam attenuator for attenuating an input laser beam comprising:
   a. a first prism partially refracting the input laser beam through a first surface and partially reflecting the input laser beam from the first surface, whereby a first refracted laser beam and a first reflected laser beam are formed;
   b. a second prism partially refracting the first reflected laser beam through a second surface and partially reflecting the first reflected laser beam from the second surface, whereby a second refracted laser beam and a second reflected laser beam are formed, wherein the second reflected laser beam partially refracts through the first surface and partially reflects from the first surface, whereby a third refracted laser beam and a third reflected laser beam are formed; and
   c. means for absorbing light such that the first, second, and third refracted laser beams are predominantly absorbed by the means for absorbing light and further such that the third reflected laser beam forms a first attenuated laser beam.

2. The laser beam attenuator of claim 1 herein the third reflected laser beam partially refracts through the second surface and partially reflects from the second surface, whereby a fourth refracted laser beam and a fourth reflected laser beam are formed, and further wherein the means for absorbing light predominantly absorbs the fourth refracted laser beam such that the fourth reflected laser beam forms a second attenuated laser beam.

3. The laser beam attenuator of claim 2 wherein the fourth reflected laser beam partially refracts through the first surface and partially reflects from the first surface, whereby a fifth refracted laser beam and a fifth reflected laser beam are formed, and further wherein the means for absorbing light predominantly absorbs the fifth refracted laser beam such that the fifth reflected laser beam forms a third attenuated laser beam.

4. The laser beam attenuator of claim 3 wherein the fifth reflected laser beam partially refracts through the second surface and partially reflects from the second surface, whereby a sixth refracted laser beam and a sixth reflected laser beam are formed, and further wherein the means for absorbing light predominantly absorbs the sixth refracted laser beam such that the sixth reflected laser forms a fourth attenuated laser beam.

5. A laser beam attenuator for attenuating an input laser beam comprising:
   a. a first prism partially refracting the input laser beam through a first surface and partially reflecting the input laser beam from the first surface, whereby a first refracted laser beam and a first reflected laser beam are formed;
   b. a second prism partially refracting the first reflected laser beam through a second surface and partially reflecting the first reflected laser beam from the second surface, whereby a second refracted laser beam and a second reflected laser beam are formed; and
   c. means for absorbing light such that the first and second refracted laser beams are predominantly absorbed by the means for absorbing light and further such that the second reflected laser beam forms a first attenuated laser beam, wherein the means for absorbing light includes a beam dump and further wherein the first refracted laser beam predominantly refracts out of the first prism and into the beam dump.

6. The laser beam attenuator of claim 5 wherein the means for absorbing light includes a light absorbing enclosure with an input aperture for the input laser beam and an output aperture for the first attenuated laser beam.

7. The laser beam attenuator of claim 5 wherein the first and second prisms are formed of an optical material having a low optical absorption coefficient and a low thermo-optic coefficient.

8. The laser beam attenuator of claim 7 wherein the first and second prisms are formed from an integral piece of the optical material such that the first and second prisms are structurally connected.

9. A laser beam attenuator for attenuating an input laser beam comprising:
   a. a first prism partially refracting the input laser beam through a first surface and partially reflecting the input laser beam from the first surface, whereby a first refracted laser beam and a first reflected laser beam are formed, wherein the first prism includes first additional surfaces such that a portion of the first refracted laser beam reflects from the first additional surfaces and returns to the first surface where the portion of the first refracted laser beam totally reflects from the first surface;
   b. a second prism partially refracting the first reflected laser beam through a second surface and partially reflecting the first reflected laser beam from the second surface, whereby a second refracted laser beam and a second reflected laser beam are formed; and
   c. means for absorbing light such that the first and second refracted laser beams are predominantly absorbed by the means for absorbing light and further such that the second reflected laser beam forms a first attenuated laser beam.

10. The laser beam attenuator of claim 9 wherein the second prism includes second additional surfaces such that a portion of the second refracted laser beam reflects from the second additional surfaces and returns to the second surface where the portion of the second refracted laser beam totally reflects from the second surface.

11. A laser beam attenuator for attenuating an input laser beam comprising:
   a. a first prism partially refracting the input laser beam through a first surface and partially reflecting the input laser beam from the first surface, thereby forming a first refracted laser beam and a first reflected laser beam;
   b. a second prism partially refracting the first reflected laser beam through a second surface and partially reflecting the first reflected laser beam from the second surface, thereby forming a second refracted laser beam and a second reflected laser beam, wherein the second reflected laser beam partially refracts through the first surface and partially reflects from the first surface, thereby forming a third refracted laser beam and a third reflected laser beam; and
   c. a light absorbing enclosure with an input aperture for the input laser beam and an output aperture for an attenuated laser beam, wherein the light absorbing enclosure predominantly absorbs the first, second, and third refracted laser beams such that the third reflected laser beam comprises the attenuated laser beam.

12. The laser beam attenuator of claim 11 further comprising a beam dump, wherein the first refracted laser beam predominantly refracts out of the first prism and into the beam dump.

13. The laser beam attenuator of claim 11 wherein:
   a. the third reflected laser beam partially refracts through the second surface and partially reflects from the second surface, thereby forming a fourth refracted laser beam and a fourth reflected laser beam; and
   d. the light absorbing body predominantly absorbs the fourth refracted laser beam such that the fourth reflected laser beam comprises the attenuated laser beam.

* * * * *

UNITED STATES PATENT AND TRADEMARK OFFICE
CERTIFICATE OF CORRECTION

PATENT NO.   : 6,497,490 B1
DATED        : December 24, 2002
INVENTOR(S)  : Miller et al.

It is certified that error appears in the above-identified patent and that said Letters Patent is hereby corrected as shown below:

<u>Column 7,</u>
Line 23, replace "herein" with -- wherein --.

Signed and Sealed this

Twenty-second Day of April, 2003

JAMES E. ROGAN
*Director of the United States Patent and Trademark Office*